(12) United States Patent
Suzuki (10) Patent No.: US 10,224,574 B2
(45) Date of Patent: Mar. 5, 2019

(54) SECONDARY BATTERY (71) Applicant: TOYOTA JIDOSHA KABUSHIKI KAISHA, Toyota-shi, Aichi-ken (JP)

(72) Inventor: Satoshi Suzuki, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 132 days.

(21) Appl. No.: 15/345,657

(22) Filed: Nov. 8, 2016

(65) Prior Publication Data

US 2017/0133718 A1 May 11, 2017

(30) Foreign Application Priority Data

Nov. 10, 2015 (JP) ................................. 2015-220078

(51) Int. Cl.
*H01M 10/058* (2010.01)
*H01M 10/0587* (2010.01)
*H01M 2/02* (2006.01)
*H01M 10/04* (2006.01)
*H01M 10/0525* (2010.01)

(52) U.S. Cl.
CPC ..... *H01M 10/0587* (2013.01); *H01M 2/0207* (2013.01); *H01M 2/028* (2013.01); *H01M 10/0431* (2013.01); *H01M 10/0436* (2013.01); *H01M 10/0525* (2013.01)

(58) Field of Classification Search
None
See application file for complete search history.

(56) References Cited

U.S. PATENT DOCUMENTS

| 2010/0203373 | A1 | 8/2010 | Kawase et al. | |
| 2011/0059344 | A1 | 3/2011 | Kawase et al. | |
| 2011/0086265 | A1* | 4/2011 | Suzuki | H01M 2/0267 429/186 |

FOREIGN PATENT DOCUMENTS

| CN | 101978547 A | 2/2011 |
| JP | 2009-026704 A | 2/2009 |
| JP | 2014-63569 A | 4/2014 |
| JP | 2015-185429 A | 10/2015 |
| KR | 10-2011-0005852 A | 1/2011 |

* cited by examiner

*Primary Examiner* — Lucas J. O'Donnell
(74) *Attorney, Agent, or Firm* — Sughrue Mion, PLLC (57) ABSTRACT

A secondary battery includes: a wound electrode body in a flat form impregnated with an electrolytic solution; an outer case in a flat form including a lid and a main body, the outer case including a curved portion, the curved portion formed into a curved surface into which the bottom surface and a wall surface of the outer case are connected; and an electric insulating film including a gap through which the electrolytic solution passes, the gap formed at a corner at the bottom surface side of the electric insulating film, the corner with the gap in the electric insulating film being clamped between the curved portion of the inner surface of the outer case and a corner at the bottom surface side of the wound electrode body.

7 Claims, 5 Drawing Sheets

SECONDARY BATTERY

INCORPORATION BY REFERENCE

The disclosure of Japanese Patent Application No. 2015-220078 filed on Nov. 10, 2015 including the specification, drawings and abstract is incorporated herein by reference in its entirety.

BACKGROUND

1. Technical Field

The present disclosure relates to a secondary battery configured by housing a wound electrode body in an outer case.

2. Description of Related Art

In secondary batteries of the related art, electric insulating films are disposed between inner surfaces of outer cases and wound electrode bodies in order to electrically insulate the inner surfaces of the outer cases from the wound electrode bodies. An example of the related art may include Japanese Patent Application Publication No. 2009-26704. In a battery of this Patent Literature, an electric insulating film is formed in a bag form to wrap an electrode body (wound electrode body). This electric insulating film in a bag form is so arranged as not to interfere with a corner part in an inner space of an outer case. Accordingly, it is facilitated to insert the electrode body wrapped by the electric insulating film into the outer case.

SUMMARY

Unfortunately, the above related art has the following problem. Specifically, a resistance of a battery tends to be increased while the battery is used. This might result from decrease in amount of an electrolytic solution contained in the wound electrode body in accordance with the usage of the battery. This means that if charging and discharging are carried out at a high rate, part of the electrolytic solution having permeated the wound electrode body might flow out from an end in a winding axial direction of the wound electrode body because of expansion and contraction of the wound electrode body. The electrolytic solution having flowed out from the wound electrode body also leaks out from the electric insulating film in a bag form, and is collected at a bottom of the outer case. This is because the electric insulating film in a bag form is usually formed by appropriately folding a single flat film, and thus there are gaps at edges and corners thereof.

In this situation, the electrolytic solution collected at the bottom of the outer case is difficult to be returned into the wound electrode body once again. This is because the electric insulating film in a bag form is prevented from interfering with the corner parts of the outer case, as aforementioned; thus, there exists no contact point between the electrolytic solution collected at the bottom, and the wound electrode body and the electric insulating film in a bag form. In particular, there has recently been a tendency not to originally contain, in the outer case, a redundant amount of an electrolytic solution more than an amount thereof sufficient for permeating the wound electrode body.

The present disclosure provides a secondary battery in a flat form allowing an electrolytic solution having flowed out from a wound electrode body to be readily returned into the wound electrode body.

A secondary battery according to one aspect of the present disclosure includes: a wound electrode body in a flat form impregnated with an electrolytic solution; an outer case in a flat form including a lid and a main body, the wound electrode body housed in the outer case in such a manner that both turned portions of the wound electrode body face the lid and a bottom surface of the main body, respectively, the outer case including a curved portion disposed at least to a longitudinal end of the bottom surface in an inner surface of the outer case, the curved portion formed into a curved surface into which the bottom surface and a wall surface of the outer case are connected; and an electric insulating film disposed between the inner surface of the outer case and the wound electrode body, the electric insulating film formed into a bag form having an opening at the lid side of the electric insulating film, the electric insulating film including a gap through which the electrolytic solution passes, the gap formed at a corner at the bottom surface side of the electric insulating film, the corner with the gap in the electric insulating film being clamped between the curved portion of the inner surface of the outer case and a corner at the bottom surface side of the wound electrode body.

In the secondary battery according to the above aspect, the electric insulating film is clamped between the curved portion at the bottom surface side of the outer case and the wound electrode body, and at this clamping position, the wound electrode body and the electric insulating film are in contact with each other, and the inner surface of the outer case and the electric insulating film are also in contact with each other. The gap through which the electrolytic solution can pass are formed in the electric insulating film at the contact position. Hence, the electrolytic solution flowing out from the wound electrode body and collected at the bottom surface of the outer case can readily be returned into the wound electrode body. Accordingly, it is possible to suppress deterioration of power generation performance due to insufficiency of the electrolytic solution in the wound electrode body.

In the secondary battery of the above aspect, the electric insulating film may include: a U-shaped portion that is curved in a U-shape such that the U-shaped portion covers both main surfaces of the wound electrode body and one of the turned portions located on the bottom surface side of the wound electrode body; lateral folded portions each of which is formed by folding, along an end surface of the wound electrode body, a portion of the electric insulating film extending in a winding axial direction of the wound electrode body from a part of the U-shaped portion corresponding to at least one of both the main surfaces of the wound electrode body; and bottom folded portions each of which is formed by folding, along the end surface of the wound electrode body, a portion of the electric insulating film extending in the winding axial direction of the wound electrode body from a part of the U-shaped portion corresponding to the one of the turned portions on the bottom surface side of the wound electrode body, the electric insulating film may include a slit between each of the lateral folded portions and a corresponding one of the bottom folded portions, and the slit may constitute the gap, and the wound electrode body and the curved portion of the outer case may be connected to each other via at least one of the bottom folded portions.

The above configured electric insulating film in a bag form can readily be formed by folding a single flat film, or the like. In the above configured electric insulating film in a bag form, the wound electrode body and the curved portion of the inner surface of the outer case are connected to each other via the bottom folded portions, thereby suppressing vibrations of the outer case being transferred to the wound electrode body by the bottom folded portions. Accordingly, the secondary battery of the above aspect is advantageous in light of durability. The "U-shape" also includes a shape of which bent portion is configured by a corner, other than a shape of which bent portion is configured only by a curved surface.

In the above aspect, the electric insulating film may include another slit at a center of the at least one of the bottom folded portions, and the other slit may constitute the gap. Through this, it is possible to secure a return path of the electrolytic solution from the outside into the inside of the electric insulating film in a bag form.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
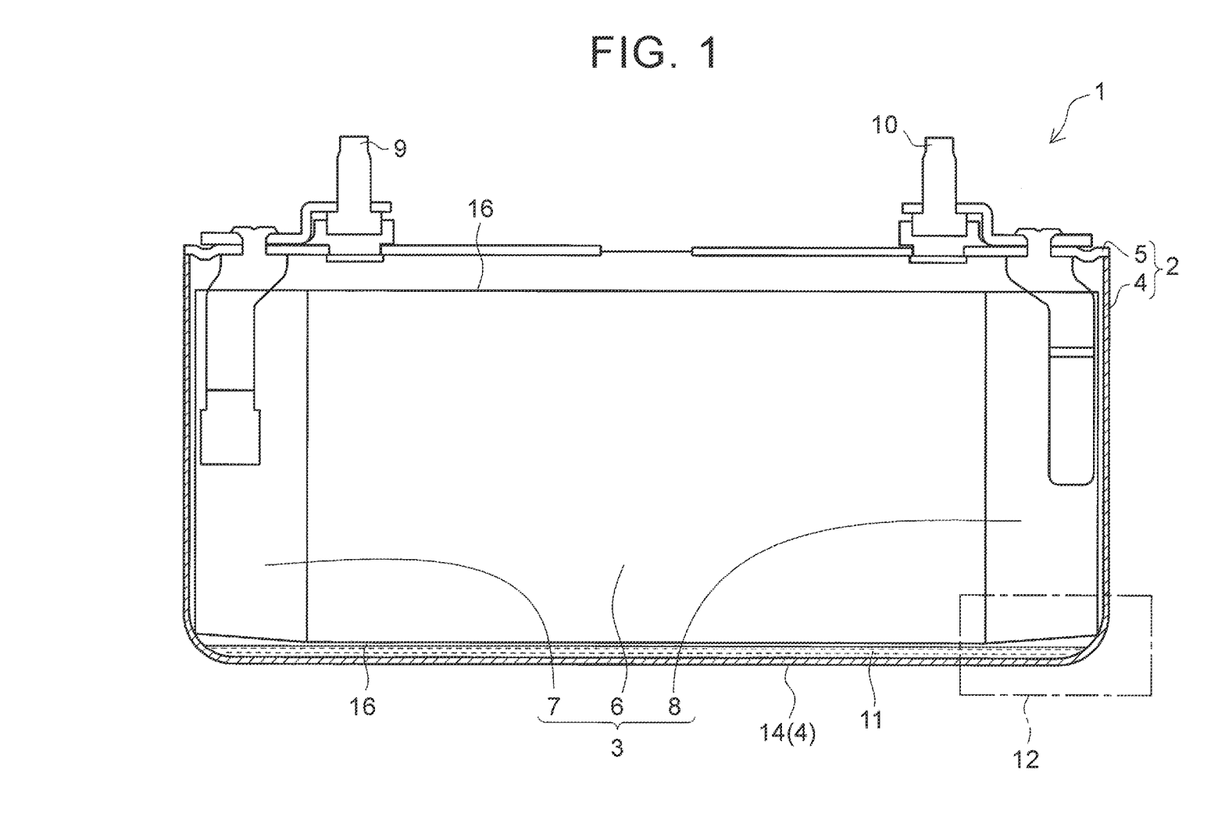
FIG. 1 is a sectional view showing a schematic structure of a secondary battery according to an embodiment.

An embodiment will be described with reference to drawings, hereinafter. The present embodiment is directed to a secondary battery 1 as shown in FIG. 1 to which a technique of the present application is applied. The secondary battery 1 in FIG. 1 is configured by housing a wound electrode body 3 in an outer case 2. The outer case 2 is configured by a main body 4 and a lid 5, and is formed in a roughly flat rectangular form. Specifically, the main body 4 of the outer case 2 is formed into a flat rectangular container of which one side (upper side in FIG. 1) is opened, and the lid 5 closes this opening.

The wound electrode body 3 is formed by overlappingly winding a positive electrode plate, a negative electrode plate, and a separator. The wound electrode body 3 in the present embodiment is formed in a flat form in accordance with the flat form of the outer case 2. The wound electrode body 3 includes a generation element 6 at a center in a winding axial direction (in FIG. 1, a right and left direction and a longitudinal direction relative to the shape of the lid 5) of the wound electrode body 3, and a positive current collector 7 and a negative current collector 8 that are located on both corresponding sides of the generation element 6. The generation element 6 is a part formed by winding all the positive electrode plate, the negative electrode plate, and the separator. The positive current collector 7 and the negative current collector 8 along with respective positive and negative electrode plates are parts formed by winding only uncoated current collecting foils. The positive current collector 7 and the negative current collector 8 are respectively connected to a positive electrode terminal 9 and a negative electrode terminal 10. The wound electrode body 3 includes a pair of turned portions 16, each of the turned portions 16 formed of respective turned portions of the wound positive electrode plate, the wound negative electrode plate, and the wound separator. In the wound electrode body 3 housed in the outer case 2, both turned portions 16 face the lid 5 and a bottom surface 14 of the main body 4, respectively.

In addition to the above components, an electrolytic solution 11 is contained in the outer case 2. The wound electrode body 3 is impregnated with most of the electrolytic solution 11 contained in the outer case 2. The electrolytic solution 11 emerging in FIG. 1 is a redundant electrolytic solution out of the wound electrode body 3, and is collected at the bottom (on the opposite side to the lid 5) in an inner space of the outer case 2.

Figure 2:
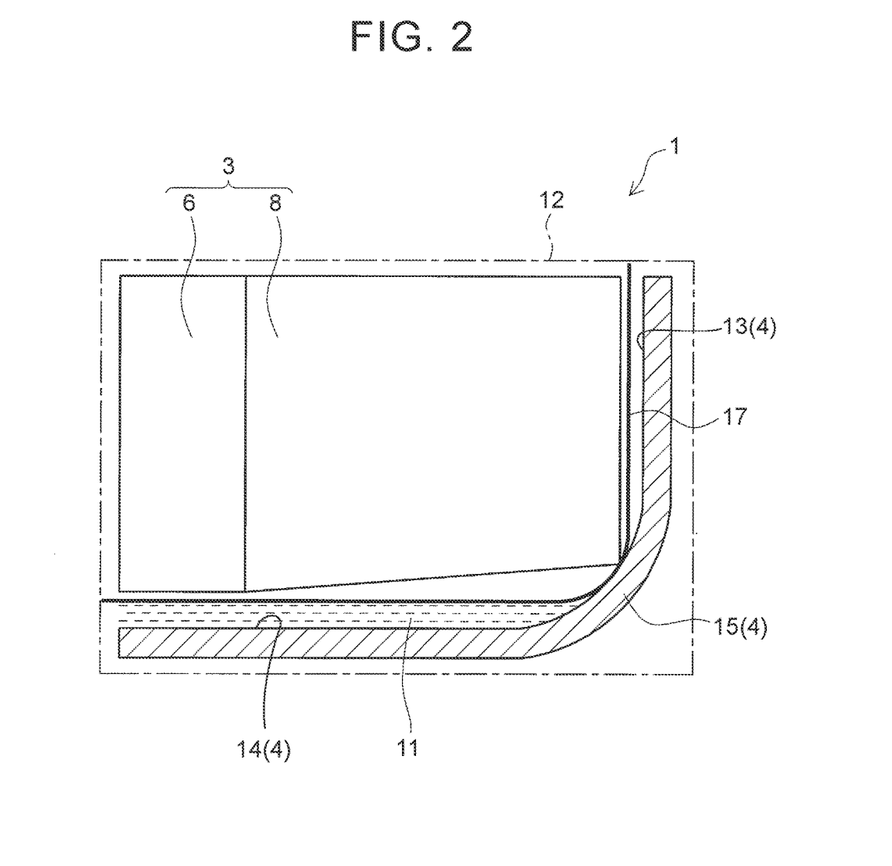
FIG. 2 is an enlarged sectional view of a corner part of the secondary battery in FIG. 1.

A corner part 12 of the outer case 2 will further be described with reference to FIG. 2 in details. As shown in FIG. 2, in the main body 4 of the outer case 2, a curved portion 15 formed in a curved surface into which a wall surface 13 and a bottom surface 14 (surface opposite to the lid 5) are connected. The curved portion 15 is disposed at least to an end in the winding axial direction of the wound electrode body 3, that is, to a short-length side of the bottom surface 14. In addition to this, a longitudinal side of the bottom surface 14 may also be formed in a curved surface.

Figure 3:
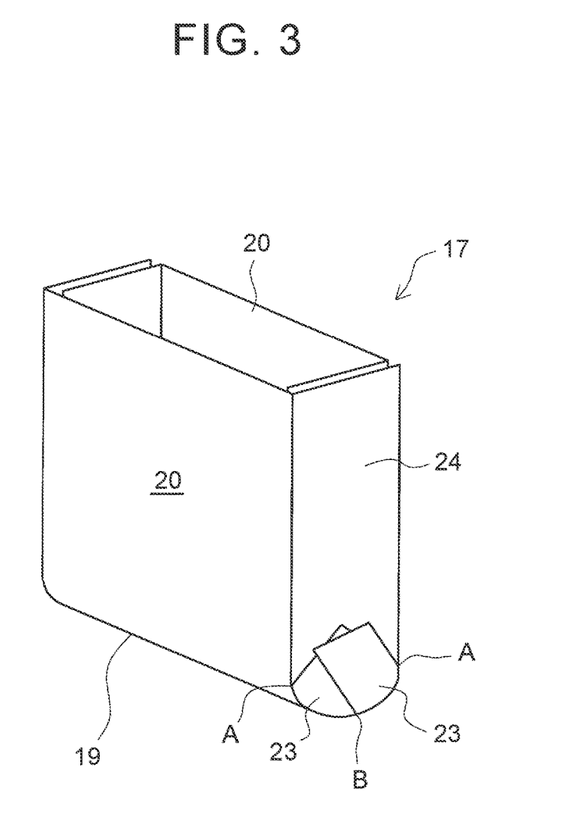
FIG. 3 is a perspective view showing a whole shape of an electric insulating film clamped between an inner surface of a main body and a wound electrode body in the secondary battery in FIG. 1.

As shown in FIG. 2, an electric insulating film 17 is clamped between the inner surface of the outer case 2 (more specifically the main body 4) and the wound electrode body 3. The electric insulating film 17 prevents a direct contact between the wound electrode body 3 and the inner surface of the outer case 2. This is for the purpose of preventing a short circuit between the positive electrode and the negative electrode via the main body 4 made of metal. As shown in FIG. 3, the electric insulating film 17 is formed in a bag form of which upper side is opened. This means that the wound electrode body 3 in the secondary battery 1 of the present embodiment is covered with the electric insulating film 17 in a bag form, and is housed in the outer case 2. Through this, it is configured that no part of the wound electrode body 3 comes into contact with the inner surface of the outer case 2. No inconvenience is caused to connection between the positive and the negative current collectors 7, 8 and the positive and the negative electrode terminals 9, 10 because of the opening at the upper side of the electric insulating film 17 in a bag form.

Figure 4:
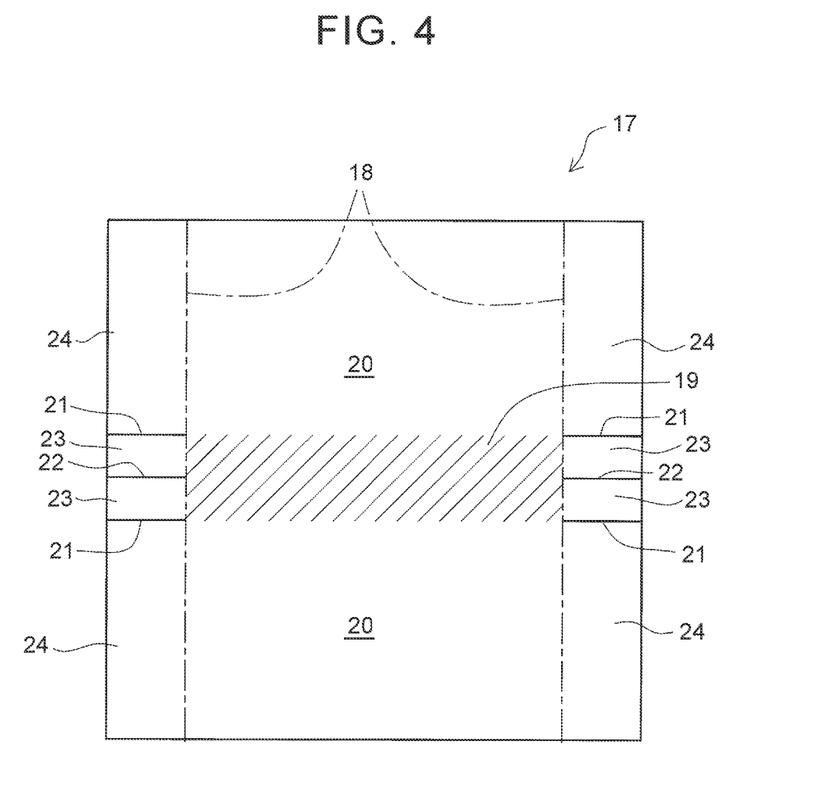
FIG. 4 is a plan view showing the electric insulating film in a flat state.

The electric insulating film 17 is formed into a bag form by forming slits in a single flat film member, and folding the single flat film member in an appropriate manner. FIG. 4 shows the electric insulating film 17 in a flat state before being folded. The electric insulating film 17 as shown in FIG. 4 has a roughly rectangular shape, and a right and left direction in FIG. 4 corresponds to the right and left direction in FIG. 1. A vertical direction in FIG. 4 also corresponds to a vertical direction in FIG. 1. It should be noted that a portion around the middle of the electric insulating film 17 in the vertical direction in FIG. 4 corresponds to the bottom of the electric insulating film 17 in a bag form as shown in FIG. 3. In other words, upper and lower ends of the electric insulating film 17 in FIG. 4 correspond to the opening of the electric insulating film 17 at upper end in a bag form in FIG. 3.

Folding lines 18 are indicated by alternate long and short dash lines in the electric insulating film 17 in FIG. 4. Each folding line 18 indicates a position at which the electric insulating film 17 is to be folded into a bag form. A distance between the two folding lines 18 corresponds to an entire width of the wound electrode body 3 including the positive current collector 7 and the negative current collector 8 as shown in FIG. 1. In FIG. 4, a curved region 19 is indicated by oblique-line hatching. The curved region 19 corresponds to a portion to be formed into the bottom of the electric insulating film 17 when the electric insulating film 17 is curved into a bag form. Naturally, this portion covers the turned portions 16 on the bottom side in the outer surface of the wound electrode body 3. In the region defined between the two folding lines 18, upper and lower parts other than the curved region 19 correspond to respective main surface regions 20 that cover flat parts (main surfaces) in the outer surface of the wound electrode body 3. This means that, in the state of the bag form as shown in FIG. 3, the curved region 19 together with both the entire main surface regions 20 located on both the sides of the curved region 19 configure a U-shaped portion so curved in a U-shape as to cover both the main surfaces and one of the turned portions 16 located on the bottom surface 14 side of the wound electrode body 3.

Slits 21, 22 are further formed in the electric insulating film 17 in FIG. 4. The slits 21, 22 are formed in outer regions outward of the two folding lines 18 in the electric insulating film 17. Each slit 21 is formed in accordance with a position of each boundary between the curved region 19 and each main surface region 20. Each slit 22 is formed at a position corresponding to a center of the curved region 19 relative to the vertical direction in FIG. 4. It should be noted that the "center" referred to herein may be unnecessary to be a strict center, and may be deemed as a center even if this position deviates from an actual center within a range of 20% or less of a vertical width of the curved region 19.

The outer regions in the electric insulating film 17 located more outward than the two folding lines 18 are partitioned by the slits 21, 22 into tab portions 23, 24. Each of tab portions (bottom folded portions) 23 is a portion extending from the curved region 19 in a longitudinal direction of the lid 5 (i.e., the winding axial direction of the wound electrode body 3). Each of tab portions (lateral folded portions) 24 is a portion extending from the corresponding main surface region 20 in the longitudinal direction of the lid 5. The slits 21, 22 allow the respective tab portions 23, 24 to be separately foldable at the corresponding folding lines 18.

Figure 5:
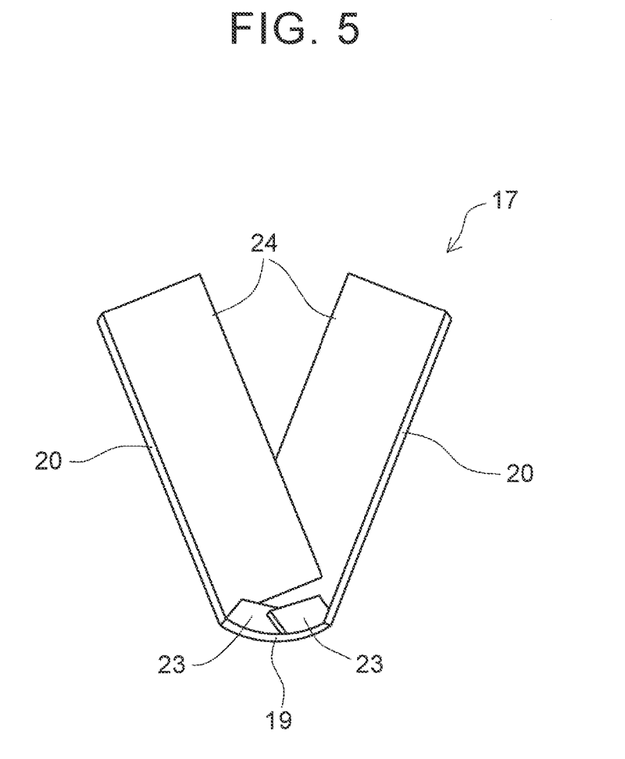
FIG. 5 is a side view showing that the electric insulating film is in a middle of a folding process.

With the aforementioned configuration of the electric insulating film 17 as shown in FIG. 14, the electric insulating film 17 is foldable into a bag form as shown in FIG. 3. At the time of folding, the electric insulating film 17 may be folded in accordance with the following procedure. The slits 21, 22 are previously formed in the electric insulating film 17. Each of the folding direction and the curving direction is supposed to be a direction in which a paper surface of FIG. 4 is folded into a valley fold. First, the folding line 18 between each tab portion 24 and each main surface region 20 is folded. In the electric insulating film 17, only each tab portion 24 is brought to stand up relative to the other portions. Subsequently, the curved region 19 is curved. This curving makes the electric insulating film 17 roughly exhibit a bag form. FIG. 5 shows that the curved region 19 is in a middle of a curving process. Finally, the folding line 18 between each tab portion 23 and the curved region 19 is folded. Through this, the electric insulating film 17 is formed into a bag form as shown in FIG. 3.

The procedure of the above folding and curving is merely an example, and any other procedure may also be employed as long as the state as shown in FIG. 3 is eventually attained. In FIG. 3, each tab portion 23 is placed more outward than each tab portion 24, but each tab portion 23 may be placed more inward than each tab portion 24, instead. After the electric insulating film 17 is formed into a bag form as shown in FIG. 3, the wound electrode body 3 may be inserted into this electric insulating film 17; or the wound electrode body 3 may be placed on the flat electric insulating film 17 as shown in FIG. 4, and then the electric insulating film 17 is folded and curved in a manner as to wrap the wound electrode body 3 along the outer surface of the wound electrode body 3.

In the electric insulating film 17 in a bag form as shown in FIG. 3, the two tab portions 24 are configured to overlap each other on each side surface of the electric insulating film 17. The two tab portions 23 also overlap each other in the vicinity of a lower end of each side surface. The tab portions 24 and the tab portions 23 are configured to be folded along the end surfaces in the winding axial direction of the wound electrode body 3. However, at each overlapping position, the tab portions 24, 23 are not sealed by welding or with an adhesive agent, or the like, but merely overlap each other. Hence, there exits gaps between the tab portions 24, 23, and thus the electrolytic solution can go in and out through these gaps.

In particular, a point A and a point B located at each corner on the bottom side correspond to positions located most inward of each slit 21, 22. This means that at each corner on the bottom side of the electric insulating film 17 in a bag form, there also exit gaps through which the electrolytic solution can go in and out. It should be noted that, for convenience of operations of inserting or installing the wound electrode body 3 into the main body 4 of the outer case 2, even if the two tab portions 24 are fixed to each other at a position near the upper end in FIG. 3 with an adhesive tape or the like, this fixation does not fall under the above "seal".

As shown in FIG. 2, to be specific, the clamping of the electric insulating film 17 between the inner surface of the main body 4 and the wound electrode body 3 is carried out between the inner surface of the curved portion 15 and each corner on the bottom surface side of the wound electrode body 3. At this position, only a portion of the electric insulating film 17 that is located near each folding line 18 between the tab portions 23 and the curved region 19 (see FIG. 4) is clamped. Accordingly, each corner part 12 of FIG. 2 has a structure to prevent a direct contact between the outer case 2 (main body 4) and the wound electrode body 3 via the electric insulating film 17, and also secure a contact between the inner surface of the main body 4 and the electric insulating film 17 as well as a contact between the wound electrode body 3 and the electric insulating film 17 at the above clamping position. Furthermore, the positions of the gaps through which the electrolytic solution can go in and out are located near the aforementioned contact positions, such as the points A and the points B.

Hence, in the secondary battery 1 of the present embodiment, even the electrolytic solution 11 that has once flowed out of the wound electrode body 3 and is collected at the bottom surface 14 (see FIG. 2) of the outer case 2 can relatively readily enter the electric insulating film 17 in a bag form through each point A and each point B. Hence, the electrolytic solution 11 having entered the electric insulating film 17 can readily permeate the wound electrode body 3 once again. Accordingly, in a normal state in which no insufficiency of the electrolytic solution in the wound electrode body 3 occurs, a level of the electrolytic solution 11 above the bottom surface 14 is unnecessary to be not less than a height of the aforementioned clamping position of the electric insulating film 17.

The clamping of the electric insulating film 17 between the inner surface of the main body 4 and the wound electrode body 3 is carried out on the inner surface of the curved portion 15, and this means that this clamping position is not so high from the bottom surface 14 of the outer case 2. Hence, it is relatively easy for the electrolytic solution 11 to reach this clamping position. In particular, if the secondary battery 1 is installed in a vehicle, the electrolytic solution 11 readily reaches the above clamping position when the level of the electrolytic solution 11 tilts due to acceleration and deceleration of the vehicle, or due to acceleration at the time of steering of the vehicle. As a position on the electric insulating film 17 comes closer to the above clamping position, the distance between the electric insulating film 17 and the inner surface of the outer case 2 becomes smaller. A capillary phenomenon caused by this works to absorb the electrolytic solution 11 toward the above clamping position.

The electric insulating film 17 is clamped to the inner surface of the curved portion 15, and this means that an entire dimension of the inner space of the main body 4 is relatively greater than the dimension of the wound electrode body 3 and the dimension of the electric insulating film 17 that wraps the wound electrode body 3. Accordingly, there is caused no particular inconvenience to installation of the wound electrode body 3 and the electric insulating film 17 that wraps this wound electrode body 3 into the main body 4.

The clamping of the electric insulating film 17 between the inner surface of the main body 4 and the wound electrode body 3 may not be accomplished by the configuration of bringing the inner surface of the main body 4 and the wound electrode body 3 to be in contact with each other at the same position on the front and the back surfaces of the electric insulating film 17. This clamping may be accomplished by connecting the wound electrode body 3 and the inner surface of the curved portion 15 to each other via the tab portions 23. Specifically, it may be configured that, in the electric insulating film 17, the inner surface near the folding line 18 between each tab portion 23 and the curved region 19 comes into contact with the wound electrode body 3, and the outer surface around the front end of each tab portion 23 comes into contact with the inner surface of the curved portion 15. Even such a configuration falls under the above "clamping". This configuration suppresses vibrations of the outer case 2 transferring to the wound electrode body 3 by the tab portions 23 even if the outer case 2 vibrates due to external factors. Accordingly, this configuration is advantageous to durability. To "connect" or to "be connected" referred to herein does not mean that the wound electrode body 3 and the inner surface of the curved portion 15 are electrically conductive to each other.

As aforementioned in details, according to the secondary battery 1 of the present embodiment, the inner surface of the main body 4 and the wound electrode body 3 are prevented from coming into contact with each other by the electric insulating film 17 in a bag form, and each corner at the bottom of the main body 4 is formed to be the curved portion 15. It is structured to provide the gaps through which the electrolytic solution 11 can pass at each corner in the electric insulating film 17 in a bag form, and at this position having the gaps, the electric insulating film 17 is clamped between each corner of the wound electrode body 3 and the inner surface of the curved portion 15. Through this, the electrolytic solution 11 collected at the bottom can readily be returned to the inside of the wound electrode body 3. In this manner, without increasing so much content of the electrolytic solution 11, or even if the electrolytic solution 11 is used under a high rate environment, it is possible to realize the secondary battery 1 in which insufficiency of the electrolytic solution in the wound electrode body 3 is unlikely to be caused. Through this, it is configured to suppress increase in resistance of the battery.

The present embodiment is merely exemplified, and is not intended to limit the present disclosure at all. Hence, various modifications and changes can naturally be made without departing from the scope of the present disclosure. For example, the type of the secondary battery 1 is not limited to a specific one, and is also applicable to a secondary battery of a conventional type, such as a lithium-ion battery and a nickel-hydrogen battery. The clamping of the electric insulating film 17 at the curved portion 15 is preferably realized on both the positive and the negative sides, but some advantageous effects can be expected even if this clamping is realized on either side thereof. If the type of the battery is a lithium-ion battery, it is more advantageous to realize the above clamping on the negative side rather than on the positive side. This is because leakage of the electrolytic solution 11 from the wound electrode body 3 is likely to occur on the negative side, and the electrolytic solution 11 at the bottom surface is more likely to tilt to be collected on the negative side.

The form of the electric insulating film 17 in a bag form is not limited to the form as shown in FIG. 3 and FIG. 4. For example, it may be considered to employ a configuration of providing no slit 22 in FIG. 4. In this case, the return of the electrolytic solution 11 to the inside of the electric insulating film 17 is mostly carried out not at the points B in FIG. 3 but at the points A; but even in such a case, some advantageous effects can also be expected. It is not essential to use the flat film member as shown in FIG. 4 as a base member, and an electric insulating film may be three-dimensionally formed into a bag form while necessary electric insulation and portions allowing the electrolytic solution 11 to flow therethrough are secured.

What is claimed is:

1. A secondary battery comprising:
    a wound electrode body in a flat form impregnated with an electrolytic solution;
    an outer case in a flat form including a lid and a main body, the wound electrode body housed in the outer case in such a manner that both turned portions of the wound electrode body face the lid and a bottom surface of the main body, respectively, the outer case including a curved portion disposed at least to a longitudinal end of the bottom surface in an inner surface of the outer case, the curved portion formed into a curved surface into which the bottom surface and a wall surface of the outer case are connected; and
    an electric insulating film disposed between the inner surface of the outer case and the wound electrode body, the electric insulating film formed into a bag form having an opening at the lid side of the electric insulating film, the electric insulating film including a gap through which the electrolytic solution passes, the gap formed at a corner at the bottom surface side of the electric insulating film, the corner with the gap in the electric insulating film being clamped between the curved portion of the inner surface of the outer case and a corner at the bottom surface side of the wound electrode body.

2. The secondary battery according to claim 1, wherein the electric insulating film includes:
    a U-shaped portion that is curved in a U-shape such that the U-shaped portion covers both main surfaces of the wound electrode body and one of the turned portions located on the bottom surface side of the wound electrode body;

lateral folded portions each of which is formed by folding, along an end surface of the wound electrode body, a portion of the electric insulating film extending in a winding axial direction of the wound electrode body from a part of the U-shaped portion corresponding to at least one of both the main surfaces of the wound electrode body; and bottom folded portions each of which is formed by folding, along the end surface of the wound electrode body, a portion of the electric insulating film extending in the winding axial direction of the wound electrode body from a part of the U-shaped portion corresponding to the one of the turned portions on the bottom surface side of the wound electrode body, the electric insulating film includes a slit between each of the lateral folded portions and a corresponding one of the bottom folded portions, and the slit constitutes the gap, and the wound electrode body and the curved portion of the outer case are connected to each other via at least one of the bottom folded portions.

3. The secondary battery according to claim 2, wherein the electric insulating film includes another slit at a center of the at least one of the bottom folded portions, and the other slit constitutes the gap.

4. The secondary battery according to claim 2, wherein each of the lateral folded portions and the corresponding one of the bottom folded portions overlap each other with the gap through which the electrolytic solution passes therebetween.

5. The secondary battery according to claim 1, wherein the curved portion is configured such that a distance between the electric insulating film and the inner surface of the outer case becomes smaller as a position on the electric insulating film comes closer to a clamping position at which the electric insulating film is clamped between the wound electrode body and the outer case.

6. The secondary battery according to claim 5, wherein the clamping position is higher than a level of the electrolytic solution that is redundant and collected at the bottom surface of the outer case.

7. The secondary battery according to claim 1, wherein the secondary battery is a lithium-ion secondary battery, the wound electrode body includes a positive current collector and a negative current collector located on both corresponding sides in the winding axial direction of the wound electrode body, and the electric insulating film is clamped at least by the corner at the negative current collector side in the wound electrode body.

* * * * *